Nov. 19, 1957

C. G. GORDON 2,813,536

HYDRAULIC UNLOADER VALVE

Filed April 18, 1955

CARROLL G. GORDON,
INVENTOR.

BY HIS ATTORNEYS.

HARRIS, KIECH, FOSTER & HARRIS.

Nov. 19, 1957

C. G. GORDON 2,813,536

HYDRAULIC UNLOADER VALVE

Filed April 18, 1955

CARROLL G. GORDON,
INVENTOR.

BY HIS ATTORNEYS.

HARRIS, KIECH, FOSTER & HARRIS.

United States Patent Office 2,813,536
Patented Nov. 19, 1957

2,813,536

HYDRAULIC UNLOADER VALVE

Carroll G. Gordon, Pasadena, Calif., assignor to Fletcher Aviation Corporation, Rosemead, Calif., a corporation of California Application April 18, 1955, Serial No. 501,790

10 Claims. (Cl. 137—108)

The present invention relates to a hydraulic unloader valve.

For purposes of the present invention, the term "hydraulic unloader valve" is to be considered to include a complete structure which is designed to be used in supplying hydraulic fluid to a hydraulic circuit within a given pressure range, such as, for example, the range of from about 700 to 1000 p. s. i. gauge. A hydraulic unloader valve, to serve this purpose, must include an inlet from a fluid pressure source, an outlet to a hydraulic system, and another outlet for unused hydraulic fluid pumped to the valve through the inlet but not sent through to the hydraulic system connected to the return side of the pressure source. If desired, the valve may be provided with outlet ports not connected to any fluid lines so as to permit the escape of unused hydraulic fluid directly to a reservoir in which the entire unloader valve can be positioned.

It is a broad object of the present invention to provide a new and improved hydraulic unloader valve of the class described, which hydraulic unloader valve may be distinguished from prior structures by virtue of its simplicity of construction, its adjustability so as to be operative under different pressures, its comparatively low cost and "foolproofness" of operation. Other objects of the present invention are to provide individual parts, such as, for example, an accumulator and a sliding valve body type of construction, which, although intended for use with a hydraulic unloader valve of the present invention, it is thought to possess utility in other applications. Further objects of the invention as well as the advantages of it will be more fully apparent from the remainder of this specification.

The actual hydraulic unloader valve of the present invention may be briefly defined or described as being concerned with a structure in which there is provided an inlet for hydraulic fluid under pressure; an outlet for this fluid to a closed hydraulic system; an outlet for this fluid to a reservoir; a first passage connecting said inlet and said system outlet; a valve chamber; a second passage connecting said valve chamber to said first passage; a check valve located within said first passage between the junction of said first and second passages and said system outlet; a hydraulic accumulator, connected to said first passage between said check valve and said system outlet; a third passage connecting said valve chamber to said reservoir outlet; a valve body movably located within said valve chamber so as to be capable of either permitting or stopping flow from said second passage to said third passage depending upon the position of said valve body; means for holding said valve body in either of two operative positions; and means for forcing said valve body from one of said operative positions to the other of said operative positions depending upon the hydraulic pressure within said first passage adjacent said system outlet.

The invention is, of course, more fully defined in the appended claims. Further details of it will be apparent from an examination of the accompanying drawings, in which:

Figure 2:
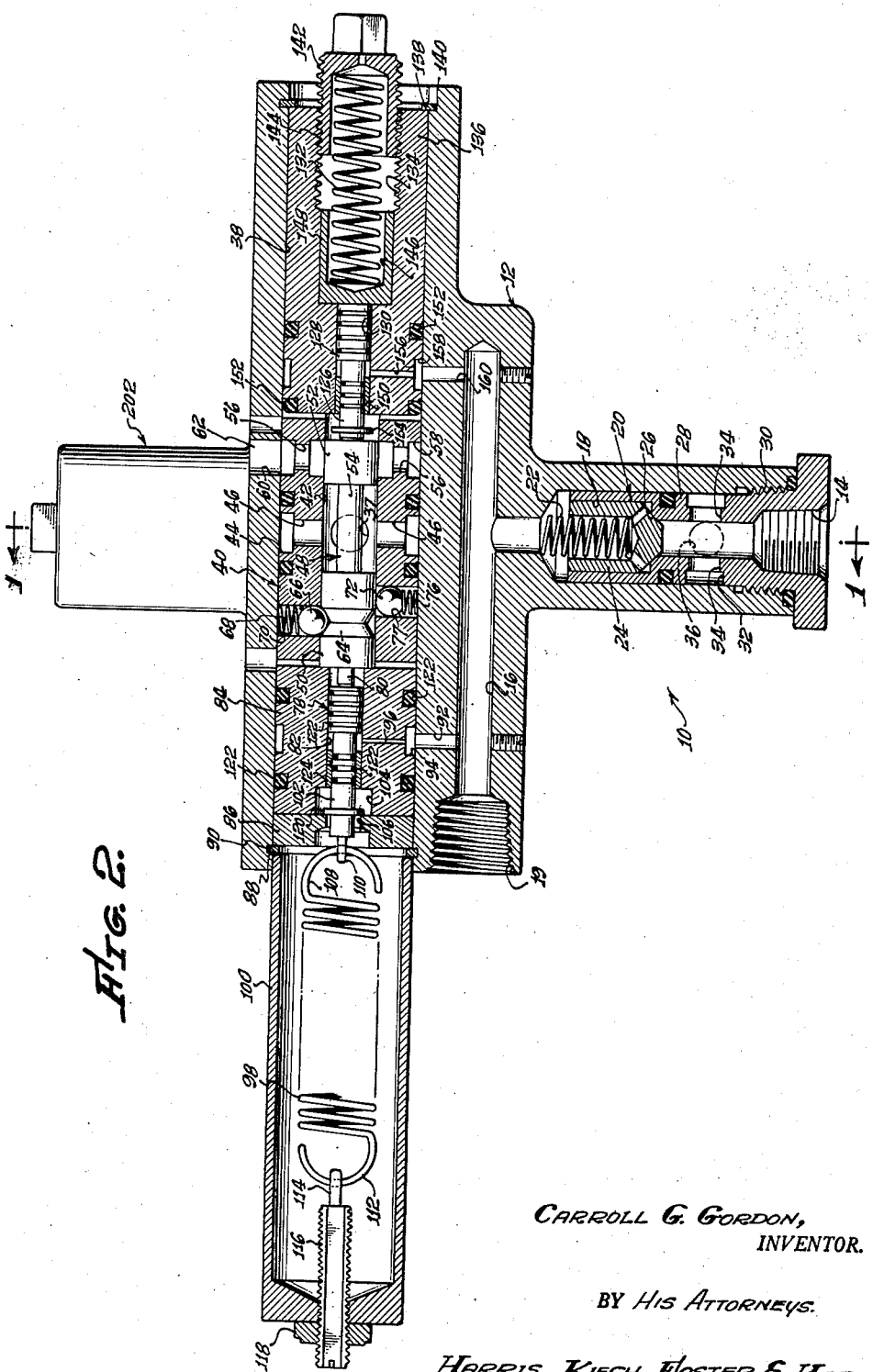
Fig. 2 is a cross-sectional view of the unloader valve taken at line 2—2 of Fig. 1.

In the drawings there is shown a complete hydraulic unloader valve 10 comprising a valve housing 12, which, as will be noted from a detailed examination of the drawings, is preferably formed from a single piece of material by various conventional metal forming operations so as to contain the individual parts herein specified as being attached to this valve housing. A check valve 20 including a threaded inlet 14 is disposed in housing 12 within an inlet chamber 18 which is in fluid communication with a cross passage 16. A supply line from a fluid pressure source (not shown) will be connected to inlet 14. The passage 16 leads to a threaded outlet opening 19 from which a line (not shown) will connect to a hydraulic system. This check valve 20, as is seen in Fig. 2 of the drawings, prevents return flow from system to source and includes a spring 22 serving to bias a movable valve body 24 against an internal valve seat 26 formed upon a cylindrical valve retainer 28 which is so positioned within the cavity 18 as to fit closely adjacent to the walls thereof so that no leakage is possible around the check valve 20. As shown in the drawings, the valve retainer 28 includes inlet 14, and is secured by threads 30 within the valve housing 12. With this type of construction the check valve 20 can be inserted into the valve housing 12 with a minimum of difficulty since the cavity 18 may be formed within the housing 12 by simple machining operations.

Figures 1, 3:
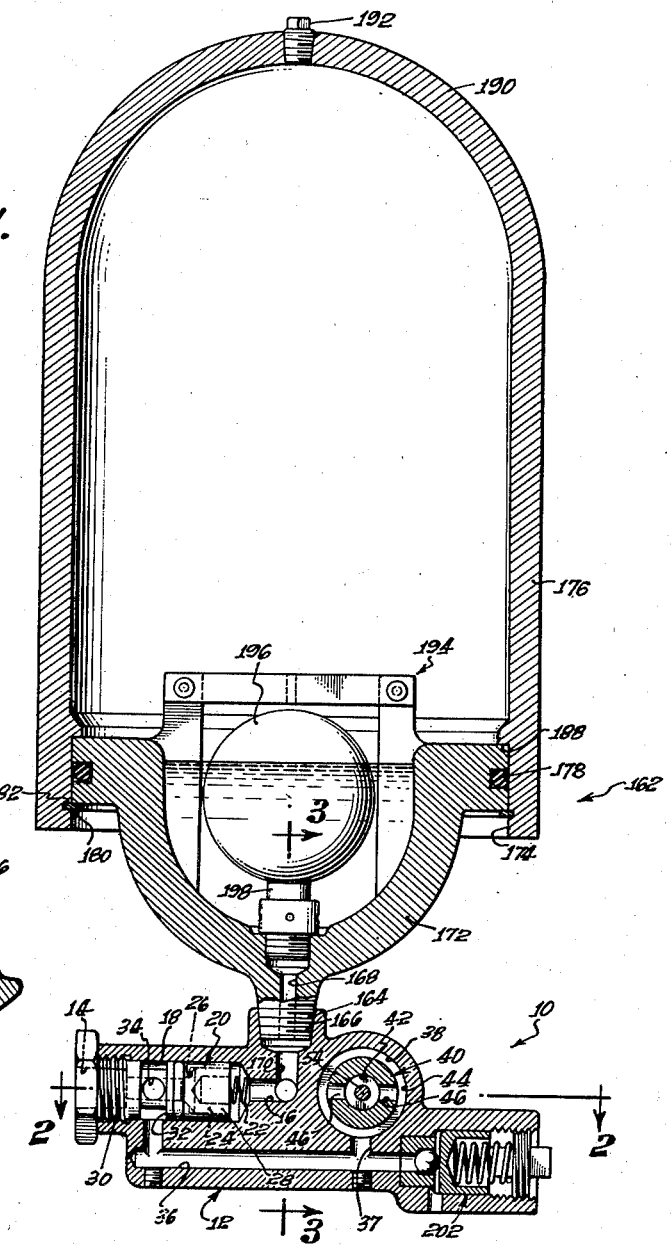
Fig. 1 is a cross-sectional view of a hydraulic unloader valve and accumulator of this invention taken at line 1—1 of Fig. 2.
Fig. 3 is a partial cross-sectional view taken at line 3—3 of Fig. 1, illustrating details of the accumulator inlet.

The portion of the check valve retainer 28 between the movable valve body 24 and the inlet 14 is provided with an annular groove 32 which is connected to the fluid pressure source at inlet 14 by radial side passages 34 in the valve retainer 28. This annular groove 32 is connected by a second passage 36 and a short cross passage 37 (Fig. 1) to an elongated bore 38 formed within the valve housing 12. Within the portion of bore 38 immediately adjacent the junction of the bore and the cross passage 37, there is located a sleeve 40 provided with an internal cylindrical chamber 42 serving as a valve chamber. The sleeve 40 is provided with an outer annular groove 44 and side passages 46 that provides fluid communication between valve chamber 42 and the cross passage 37 to second passage 36 thus placing the valve chamber 42 in fluid communication with inlet 14 at all times, through the system of passages described.

Within valve chamber 42 there is positioned a valve body 48 having the essential form of a spool in which cylindrical ends 50 and 52 are connected together by means of a centrally located connecting rod 54. Because of the construction employed, the valve body 48 can slide within the valve chamber 42 from an initial position, such as is indicated in Fig. 2 of the drawings, to a position slightly to the right of that illustrated in which the end 52 of the valve body is moved so as to uncover side passages 56 within the sleeve 40 leading to an annular groove 58 also formed in the sleeve 40. This annular groove is in communication with a short passage 60 leading to a valve body return outlet 62 formed within the valve housing 12 and directed to a reservoir (not shown) or to a return side of the fluid pressure source (not shown). It will be realized from the initial discussion of this invention that this valve outlet 62 is not illustrated with provision to connect the valve 10 to a line for a return of unused hydraulic fluid to the pressure source inasmuch as the illustrated valve 10 is designed to be mounted directly within a reservoir for hydraulic fluid.

The end 50 of the valve body 48 is provided with an outer V-shaped groove 64, which, when the valve body 48 is positioned in the location shown in Fig. 2, is designed to be engaged by means of a ball 66 which is urged towards the valve body 48 by means of a spring 68, both the ball 66 and the spring 68 being located within a short cylindrical side passage 70 formed within the sleeve 40. When the valve body 48 is moved to a second position, as described above, so as to permit flow through the valve chamber 42 to the valve return outlet 62, the ball 66 is pushed back within the cylindrical side passage 70 and another ball 72 is urged by means of a spring 76 into contact with the V-groove 64. Both the ball 72 and the spring 76 are located within another cylindrical side passage 77 formed within the sleeve 40, a distance along the bore 38 corresponding to the distance the valve body 48 is moved during operation of the valve 10. Thus, with this construction the balls 66 and 72 serve as detents to retain the valve body in either of two operative positions, in one of which hydraulic flow to the reservoir outlet 62 is prohibited and in the other of which such flow is permitted. The detent force of the balls 66 and 72 may be readily overcome by movement tending to force the valve body from one of the two positions indicated to another.

When the valve body 48 is in the position shown in Fig. 2 of the drawings, hydraulic flow to the valve return outlet 62 is prohibited. This position of the valve body 48 is, for convenience, designated herein as the "left-hand" position. When the valve body 48 is located so as to permit hydraulic flow to the value return outlet 62, the position of this valve body is, for convenience, termed the "right-hand" position. Movement from the left-hand to the right-hand position of the valve body 48 is caused by means of a small piston 78 moving against a projection 80 formed upon the left hand end 50 of the valve body 48 so as to project from the sleeve 40 into a cylinder 82 formed in a second sleeve 84 located within the elongated bore 38 immediately adjacent the sleeve 40. The position of this second sleeve 84 within the bore 38 is maintained by means of a retaining sleeve 86 which bears against a retaining ring 88 located within a small groove 90 formed around the periphery of the bore 38 adjacent its left hand end.

The piston 78 is actuated during operation of the valve 10 to force the valve body 48 from the left-hand position shown to the right-hand position by means of pressure within the first passage 16, which pressure is transmitted to the piston 78, on the side thereof remote from the valve body 48, through a short passage 92 eading from the first passage 16 to the interior of the bore 38 where this passage 92 is in fluid communication with a groove 94 formed around the sleeve 84. The groove 94 is, in turn, connected to the cylinder 82 on the side of the piston 78 remote from the valve body 48 by means of a short connecting passage 96 through sleeve 84.

Motion of the piston 78 is not only controlled by the pressure of fluid within the first passage 16, by virtue of hydraulic fluid from within this first passage being in fluid communication through the series of passages and grooves indicated so as to bear against the piston 78, but is also controlled by means of a spring 98 located within a tubular housing 100 abutting the retainer ring 90 aligned with the bore 38. This spring is attached to a piston rod 102 connected to the piston 78 and passing through the cylinder 82 past an enlarged end opening 104 within the sleeve 84, and thence through a center opening 106 within the retaining sleeve 86.

The actual means of attachment of the spring 98 to this piston rod 102 is by an end 108 of the spring 98 passing through an eye 110 formed on the end of the piston rod 102. The other end 112 of the spring 98 is anchored in another eye 114 formed on the end of a threaded member 116 which is in threaded engagement with an appropriately formed threaded bushing 118 secured to the housing 100.

With this construction, the force exerted by the spring 98 on the piston 78 may be adjusted by merely turning the threaded member 116 so as to regulate the tension of the spring 98 in the obvious manner.

A small collar 120 is provided upon the piston rod 102 and is positioned within the end opening 104 of sleeve 84 and serves to limit the movement of the piston 78. Thus, when piston 78 is in the position shown in Fig. 2 of the drawings, the collar 120 bears against the retaining sleeve 86, preventing further movement of the piston 78 in this direction. When the hydraulic pressure within the passage 16 is sufficient to cause the piston 78 to move toward its right-hand position, collar 120 will bear against the portion of the end opening 104 in sleeve 84 remote from the retaining sleeve 86, and thus limit movement of the piston 78 in a right-hand direction.

Appropriate sealing means 122 of a conventional nature such as the illustrated O-rings are provided in grooves on the sleeve 84, the piston 78, and the piston rod 102 for the obvious purpose. Movement of the piston rod 102 within the cylinder 82 is normally governed by means of a guide sleeve 124 located in the end of cylinder 84 and secured to the walls thereof.

When the valve body 48 has been moved to the right-hand position by the piston 78 so as to disengage the ball 66 and move the valve body 48 so that the ball 72 serves to hold it in position, a push rod 126 attached to another piston 128 at the opposite end of the valve body from the piston 78 is moved within a cylinder 130 against the force of a spring 132 held within an enlarged cavity 134 in another sleeve 136. It will be seen from an examination of Fig. 2 that this other sleeve 136 is held in place within the elongated bore 38 by means of a retaining ring 138 engaging the sleeve 136 and a groove 140 formed around the bore 38 adjacent an end thereof. The spring 132 is held within the cavity 134 against a threaded plug 142 secured to threads 144 formed on the internal surface of this cavity 134. The end of the spring 132 remote from the plug 142 is normally carried within a cavity 146 in a sliding member 148 secured to the other piston 128 so as to be capable of sliding within the cavity 134. The movement of the piston 128 towards the valve body 48 is restricted by means of this sliding member 148 hitting the portion of the cavity 134 immediately adjacent the cylinder 130.

A small guide sleeve 150 is located within the portion of the cylinder 130 immediately adjacent the valve body 48 for the obvious purpose of guiding the push rod 126. Appropriate sealing means 152 of a conventional category are provided in grooves on the exterior of the sleeve 136, the piston 128, and the push rod 126 for the obvious purpose. Also, a small collar 154 is formed near the extremity of the push rod 126 immediately adjacent the valve body 48, which collar is adapted to bear against the sleeve 136 and limits movement of the push rod 126 to the right when the forces employed upon the piston 78 are such as to force valve body 48 towards the right as viewed in Fig. 2.

Movement of the piston 128 is, of course, in part governed by means of the spring 132. It is further controlled by means of the hydraulic pressure within the passage 16, which pressure is transmitted to this piston on the side thereof adjacent the valve body 48 between the piston 128 and the guide sleeve 150 through a small passage 156 formed within the sleeve 136 leading from an annular groove 158 formed on the exterior surface of the sleeve 136, which annular groove 158 is in communication with the passage 16, by means of a short passage 160.

The exact operation of the valve body 48 and the various pistons and other means indicated above will, of course, be more fully explained in detail. The operation of the valve and these pistons is interrelated with the operation of a hydraulic accumulator 162 forming a part of the valve 10. This hydraulic accumulator (Figures 1 and 3) consists of a lower threaded section 164 which is connected to an appropriate threaded opening 166 within the housing 12 so that a passage 168 within this threaded section 164 is in communication with a short upstanding passage 170 in the housing 12 leading to the first passage 16. The threaded section 164 is formed as part of a cup-shaped bottom 172 of the accumulator 162, which cup-shaped bottom is secured within a cylindrical bottom portion 174 of a top 176 of the accumulator 162 by means of a conventional sealing ring 178 and a retaining ring 180 held within a groove 182 formed within the bottom portion 174. This top 176 is provided with an annular shoulder 188 immediately adjacent the bottom portion 174 which serves to limit movement of the bottom 172 towards the top 176, and is provided with a dome-shaped top end 190 within which there is located a conventional plug 192 for adjusting the quantity of air retained within the accumulator 162. Normally air under pressure is introduced into the accumulator 162 through this plug. A cage-like structure 194 within the bottom 172 of this accumulator 162 serves to govern the motion of a hollow sphere 196 from an upper position against this cage-like structure 194 in which a valve body 198 attached to the sphere (Fig. 3) is removed from a valve seat 200 formed upon the bottom 172 so as to permit flow from the passage 16 upwards into the accumulator 162. Under certain conditions, as will be more fully indicated, this sphere 196 moves to a downward position with the valve body 198 being positioned against the valve seat 200.

As a safety means with the present invention a relief valve 202 of conventional design is provided connected to the second passage 36 so as to permit escape of hydraulic fluid from the complete valve 10 to a return line (not shown) or a reservoir (not shown), in case of malfunctioning of any part of this valve.

In spite of the complexity of the structure described above, the operation of the valve 10 is essentially comparatively simple. In use, this valve is preferably located within a hydraulic reservoir and the valve inlet 14 is connected to an appropriate source of hydraulic fluid under pressure, while the threaded outlet 19 is connected ton an appropriate hydraulic system. After these connections have been made, hydraulic fluid is introduced under pressure through the inlet 14. The force of such fluid moves the valve body 24, allowing flow from the inlet 14 into the first passage 16. As such flow occurs, the sphere 196 within the hydraulic accumulator 162 is lifted, allowing fluid flow into the accumulator so that pressure is built up within it. The precise rate at which pressure builds up will, of course, be dependent upon the rate at which fluid is simultaneously used by the attached hydraulic system. As the accumulator 162 is charged, the sphere 196 floats within the cage structure 194 because of the buoyant effect of the hydraulic fluid entering the accumulator through the passages 168 and 170. This sphere continues to float until such time as the pressure within the accumulator is caused to drop by virtue of use of hydraulic fluid through the system to such an extent that the sphere no longer floats within the hydraulic fluid present. With this accumulator construction complete escapement of all hydraulic fluid from the accumulator is prevented.

During the pressure build-up, hydraulic fluid flows from the inlet 14 through the second passage 36, as previously described, to between the two ends 50 and 52 in the valve body 48. Simultaneously, this hydraulic fluid is conveyed by passages and grooves as previously indicated so as to bear against the valve control pistons 78 and 128. As the pressure within the passage 16 increases, the piston 128 will be forced against the pressure of the spring 132, which is adjusted for a lighter force than spring 98, removing the push rod 126 from against the right hand end 52 of the valve body 48. Next, as this pressure within the passage 16 increases, the piston 78 will be forced to the right, stretching the spring 98 so as to move the valve body 48 from the left-hand position previously described to a right-hand position where the end 52 of this valve body rests against the push rod 126, and where the valve body 48 is retained in position by means of the ball 72 fitting within the V-groove 64. In this right-hand position, flow is permitted from the inlet 14 through the passage 36 and various other passages described to the outlet 62, and thence into the hydraulic reservoir within which the valve 10 is disposed.

Flow in this manner by-passing the passage 16 will continue until such time as two things have occurred. The first of these is the reduction of the pressure within the passage 16 and the attached hydraulic system to such an extent that the hydraulic pressure within this passage 16 is no longer sufficient to maintain the piston 78 in its position against the end 50 of the valve body 48 as this valve body is in the right-hand position previously described. When the pressure within the passage 16 slips below this critical figure, the spring 98 will automatically pull this piston 78 back into the position indicated in Fig. 2 of the drawings but, at this stage, spring 132 does not exert sufficient force to overcome the hydraulic pressure on piston 128. As pressure within the passage 16 is reduced to a still further extent, this pressure will no longer be sufficient to hold the piston 128 against the force of the spring 132, and this spring 132 will force the piston 128 and the attached push rod 126 to the left to a position such as is shown in Fig. 2 of the drawings. During such motion the valve body 48 will be pushed from a right-hand position to a left-hand position, and flow of hydraulic fluid through the passage 36 to the outlet 62 will be prevented. At this point the valve body 24 will again move from the valve seat 26, and hydraulic fluid will be introduced into the passage 16, permitting the recharging of the hydraulic accumulator 162 and a complete repetition of the cycle of operations previously described.

It will be realized from the above description that the valve body 24 will automatically move against the valve seat 26 by the action of the spring 22 during such time as hydraulic flow is permitted to the hydraulic reservoir, and that the operation of the hydraulic accumulator 162 during such flow to the hydraulic reservoir is essentially that of any hydraulic accumulator in supplying hydraulic fluid under pressure.

For convenience of explanation, no pressures have been mentioned in the above description of the operation of the invention. However, a very effective valve embodying the principles of this invention has been made which is designed to supply hydraulic fluid to a hydraulic system at pressures within the range of from 700 p. s. i. to 1000 p. s. i. Within this valve the springs 98 and 132 are adjusted so that the piston 128 moves against the spring 132 at the lower of these pressures, and so that the piston 78 moves stretching the spring 98 at the higher of these pressures. Obviously, the construction of the invention can be set for virtually any pressure range with a minimum of difficulty by merely adjusting the tension or compression upon either of the springs 98 or 132.

The valve 10 of the present invention is extremely advantageous from a commercial standpoint because of the ease of manufacture and assembly. This valve can be formed of a single solid block by drilling appropriate holes with conventional mechanisms within this block, and inserting the various members herein described within these holes. Because of this simplicity, it is thought that the valve 10 of the present invention will find wide application for a number of uses; it is effectively foolproof in operation and extremely efficient for the purpose intended.

Obviously, a number of modifications may be made within the construction herein described without departing from the essential teachings of the present invention. Such modifications are to be considered as part of the inventive concept insofar as they are within the skill of the art and are defined by the appended claims.

I claim as my invention:

1. A new and improved hydraulic unloader valve, which comprises: means defining an inlet for hydraulic fluid under pressure; means defining an outlet for hydraulic fluid to a closed hydraulic system; means defining an outlet for hydraulic fluid to a reservoir for hydraulic fluid; means defining a first passage connecting said inlet with said system outlet; means defining a valve chamber; means defining a second passage connecting said valve chamber to said first passage; a check valve located within said first passage between the junction of said first passage and said second passage and said system outlet; a hydraulic accumulator connected to said first passage between said check valve and said system outlet; means defining a third passage connecting said valve chamber to said outlet to a reservoir; a valve body movably located within said valve chamber so as to be capable of movement to regulate flow from said second passage to said third passage; means for holding said valve body in either of two operative positions; and means for forcing said valve body from one of said operative positions to the other of said operative positions depending upon the hydraulic pressure within said first passage adjacent said system outlet.

2. A hydraulic unloader valve as defined in claim 1, wherein said valve chamber is generally cylindrical in shape, and wherein said valve body has the essential form of a spool including cylindrical ends connected together by a centrally located connecting rod.

3. A hydraulic unloader valve as defined in claim 2, wherein said means for forcing said valve body from one of said operative positions to the other of said operative positions comprise piston means, and wherein said piston means are connected to said first passage between said check valve and said system outlet by passage means so that said piston means are responsive to the pressure of hydraulic fluid within said first passage.

4. A hydraulic unloader valve as defined in claim 3, wherein the motion of said piston means is partially governed by spring means attached to said piston means.

5. A hydraulic unloader valve as defined in claim 2, wherein said means for holding said valve body in either of two operative positions comprises spring-loaded means positioned adjacent said valve chamber so as to project into said valve chamber and engage part of said valve body.

6. In a valve construction, a structure which comprises: means defining an elongated valve chamber; a valve body positioned within said valve chamber, said valve body having the essential form of a spool with enlarged ends fitting against the walls of said valve chamber, said ends being connected together by rod means; means for holding said valve body within either of two positions within said valve chamber; and piston means aligned with said valve body, adapted to bear against said valve body, and located externally of said valve chamber so as to project into said valve chamber.

7. A structure as defined in claim 6, wherein a groove is located surrounding an end of said spool, and wherein said means for holding said valve spool within either of two positions within said valve chamber comprise ball means normally biased by spring means against said valve body, said ball means being capable of engaging said groove within said spool.

8. A structure as defined in claim 6, wherein said piston means are attached to spring means serving to govern the pressure which must be applied to said piston means in order to move said piston means against said valve body.

9. A new and improved hydraulic unloader valve, which comprises: means defining an inlet for hydraulic fluid under pressure; means defining an outlet for hydraulic fluid to a closed hydraulic system; means defining an outlet for hydraulic fluid to a reservoir for hydraulic fluid; means defining a first passage connecting said inlet with said system outlet; means defining a valve chamber; means defining a second passage connecting said valve chamber to said first passage; a check valve located within said first passage between the junction of said first passage and second passage, and said system outlet; a hydraulic accumulator connected to said first passage between said check valve and said system outlet, said hydraulic accumulator including a bottom portion having means therein defining a passage; a valve seat surrounding said passage in said bottom portion connected to said first passage with said valve seat positioned so as to be remote from said first passage; a top portion secured to said bottom portion; a sphere located within said top and said bottom portions, said sphere being capable of floating in hydraulic fluid and being located adjacent said bottom portion; means within said hydraulic accumulator for controlling movement of said sphere; a valve body attached to said sphere, said valve body being adapted to seat against the valve seat so as to prevent flow of hydraulic fluid from said hydraulic accumulator; means defining a third passage connecting said valve chamber to said outlet to a reservoir; a valve body movably located within said valve chamber so as to be capable of movement to regulate the flow from said second passage to said third passage; means defining a depression in said valve body; spring-biased means located adjacent said valve chamber so as to be capable of projecting into said valve chamber, said spring-biased means being capable of engaging said depression in said valve body so as to lock said valve body in either of two positions, the first of said positions permitting flow from said second passage to said third passage, and the second of said positions preventing flow from said second passage to said third passage; piston means located externally of said valve chamber and capable of projecting into said valve chamber so as to bear against said valve body; spring means attached to each of said piston means so as to partially govern the movement of said piston means; means defining cylinders about said piston means; and passage means connecting said means defining cylinders with said first passage between said check valve and said system outlet, whereby hydraulic fluid from said first passage is introduced into said means defining cylinders so as to cause said pistons to move in order to move said valve body within said valve chamber.

10. A new and improved hydraulic unloader valve, which comprises: means defining an inlet for hydraulic fluid under pressure; means defining an outlet for hydraulic fluid to a closed hydraulic system; means defining an outlet for hydraulic fluid to a reservoir for hydraulic fluid; means defining a first passage connecting said inlet with said system outlet; means defining a valve chamber; means defining a second passage connecting said valve chamber to said first passage; a check valve located within said first passage between the junction of said second passage with said first passage and said system outlet; means defining a third passage connecting said valve chamber to said outlet to a reservoir; a valve body movably located within said valve chamber so as to be capable of movement to regulate flow from said second passage to said third passage; means for holding said valve body in either of two operative positions; and means for forcing said valve body from one of said operative positions to the other of said operative positions depending upon the hydraulic pressure within said first passage adjacent said system outlet.

References Cited in the file of this patent

UNITED STATES PATENTS

| | | |
|---|---|---|
| 2,087,913 | Kenney et al. | July 27, 1937 |
| 2,320,763 | Trautman | June 1, 1943 |
| 2,583,539 | Bashark et al. | Jan. 29, 1952 |